United States Patent
Seo et al.

(10) Patent No.: US 10,624,113 B2
(45) Date of Patent: Apr. 14, 2020

(54) METHOD FOR TRANSMITTING AND RECEIVING SIGNAL THROUGH SIDELINK IN NEXT GENERATION WIRELESS COMMUNICATION SYSTEM, AND APPARATUS THEREFOR

(71) Applicant: LG Electronics Inc., Seoul (KR)

(72) Inventors: Hanbyul Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/089,460

(22) PCT Filed: Mar. 29, 2017

(86) PCT No.: PCT/KR2017/003399
§ 371 (c)(1),
(2) Date: Sep. 28, 2018

(87) PCT Pub. No.: WO2017/171390
PCT Pub. Date: Oct. 5, 2017

(65) Prior Publication Data
US 2019/0124673 A1    Apr. 25, 2019

Related U.S. Application Data

(60) Provisional application No. 62/314,981, filed on Mar. 29, 2016.

(51) Int. Cl.
*H04W 72/12* (2009.01)
*H04L 5/00* (2006.01)
(Continued)

(52) U.S. Cl.
CPC .......... *H04W 72/1263* (2013.01); *H04L 1/00* (2013.01); *H04L 5/0032* (2013.01);
(Continued)

(58) Field of Classification Search
CPC .......... H04W 72/1263; H04W 72/0446; H04L 5/0023; H04L 5/0092; H04L 5/0083;
(Continued)

(56) References Cited

U.S. PATENT DOCUMENTS

2015/0334715 A1   11/2015 Chang
2016/0056942 A1*  2/2016 Wang .................... H04L 5/0048
                                                                370/330
(Continued)

FOREIGN PATENT DOCUMENTS

WO   WO-2016021933 A1 *  2/2016  ............... H04L 5/14

OTHER PUBLICATIONS

International Search Report in International Application No. PCT/KR2017/003399, dated Jul. 26, 2017, 15 pages (with English Translation).
(Continued)

Primary Examiner — Omar J Ghowrwal
(74) Attorney, Agent, or Firm — Fish & Richardson P.C.

(57) ABSTRACT

The present application provides a method for transmitting and receiving, by a terminal, a sidelink signal through a subframe including a plurality of symbols in a wireless communication system. Specifically, the method comprises the steps of receiving a first sidelink control signal including symbol information for a sidelink data signal, on a predetermined first symbol of a subframe; receiving the sidelink data signal on the subframe according to the first sidelink control signal; and transmitting a second sidelink control signal including response information for the sidelink data signal, on a second symbol of the subframe, wherein the first symbol is determined under the assumption that a maximum number of symbols reserved for a downlink control signal
(Continued)

exist on the subframe, and the second symbol is a symbol immediately before a symbol reserved for an uplink control signal on the subframe.

12 Claims, 15 Drawing Sheets

(51) Int. Cl.
    *H04L 1/00*     (2006.01)
    *H04W 72/04*     (2009.01)
    *H04L 1/18*     (2006.01)

(52) U.S. Cl.
    CPC .......... *H04L 5/0053* (2013.01); *H04L 5/0083* (2013.01); *H04L 5/0092* (2013.01); *H04W 72/0446* (2013.01); *H04L 1/1812* (2013.01); *H04L 5/0023* (2013.01)

(58) Field of Classification Search
    CPC ....... H04L 5/0053; H04L 5/0032; H04L 1/00; H04L 1/18212
    See application file for complete search history.

(56) References Cited

U.S. PATENT DOCUMENTS

| | | | |
|---|---|---|---|
| 2016/0073408 A1 | 3/2016 | Sartori | |
| 2016/0226649 A1* | 8/2016 | Papasakellariou | .... H04L 5/0057 |
| 2019/0013908 A1* | 1/2019 | Xiong | ................. H04L 5/0037 |

OTHER PUBLICATIONS

Huawei, "Discussion on new frame structure for latency reduction in TDD," 'R1-160754', 3GPP TSG RAN WG1 Meeting #84, St. Julian's, Malta, Feb. 15-19, 2016, 9 pages.

Ericsson, "5G—Key Component of The Networked Society," 'RWS-150009', 3GPP RAN Workshop on 5G, Phoenix, AZ, USA, Sep. 17-18, 2015, 55 pages.

Samsung, "Scheduling assignment options for V2V communication." 'R1-160576', 3GPP TSG RAN WG1 #84, St Julian's, Malta, Feb. 15-19, 2016, 5 pages.

* cited by examiner

FIG. 2
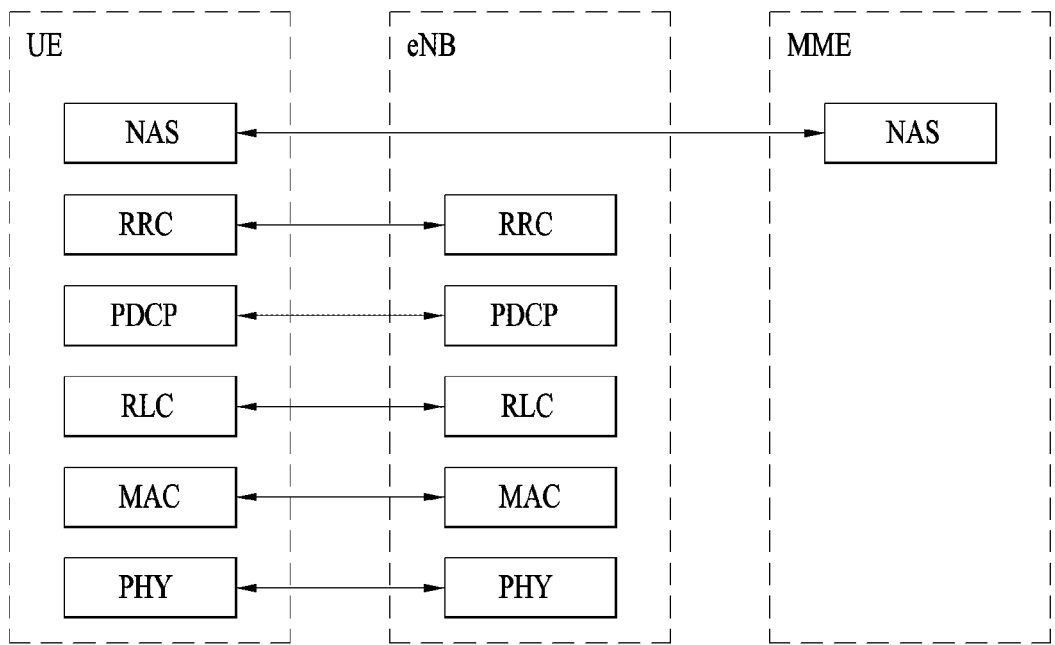
(A) CONTROL-PLANE PROTOCOL STACK
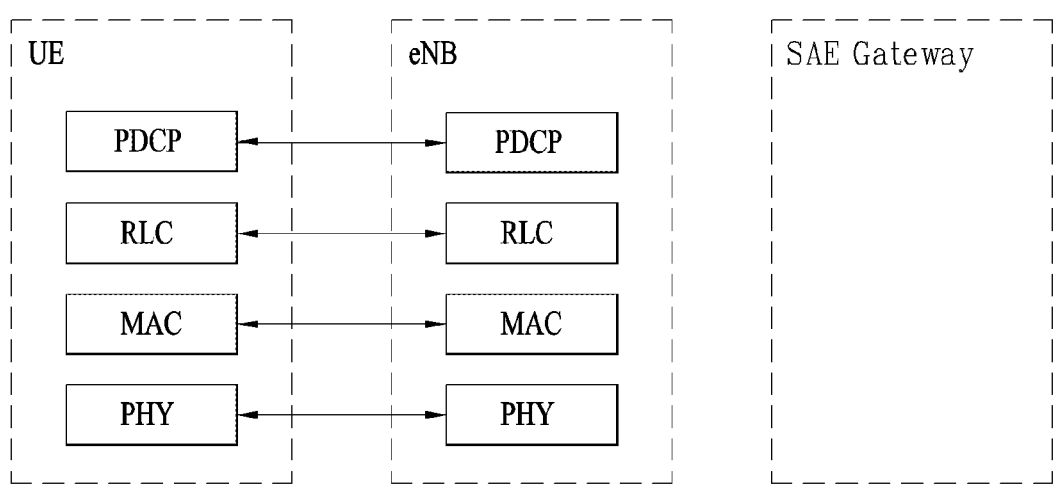
(B) USER-PLANE PROTOCOL STACK

FIG. 9

| Config | Symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd / CSI-RS | Dd / CSI-RS |
| 1 | Dc | Dd | Dd | Dd | Dd | Dd | Dd | Dd | Dd | Dd | Dd | Dd | GP | Uc / SRS |
| 2 | Dc | Dc | Dd | Dd | Dd | Dd | Dd | Dd | Dd | Dd | Dd | Dd | Dd / CSI-RS | Dd / CSI-RS |
| 3 | Dc | Dc | Dd | Dd | Dd | Dd | Dd | Dd | Dd | Dd | Dd | Dd | GP | Uc / SRS |
| 4 | Dc | GP | Ud | Ud | Ud | Ud | Ud | Ud | Ud | Ud | Ud | Ud | Ud | Uc |
| 5 | Dc | GP | Ud | Ud | Ud | Ud | Ud | Ud | Ud | Ud | Ud | Ud | Ud | Uc / SRS |
| 6 | Dc | GP | Ud | Ud | Ud | Ud | Ud | Ud | Ud | Ud | Ud | Ud | Ud | CSI-RS |
| 7 | Dc | GP | Ud | Ud | Ud | Ud | Ud | Ud | Ud | Ud | Ud | Ud | SRS | CSI-RS |
| 8 | Dc | GP | Ud | Ud | Ud | Ud | Ud | Ud | Ud | Ud | Ud | Ud | SRS | Uc |

FIG. 11

| Symbol index | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| Dc | GP | SA | Sd | Sd | Sd | Sd | Sd | Sd | Sd | Sd | Sd | Sd | Sc |
| Dc | GP | SA | Sd | Sd | Sd | Sd | Sd | Sd | Sd | Sd | Sd | GP | Sc |

FIG. 13

| Symbol index | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| SA | Sd | Sd | Sd | Sd | Sd | Sd | Sd | Sd | Sd | Sd | Sd | GP | Sc |

FIG. 15

| Symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | SA | Sd | Sd | Sd | Sd | Sd | Sd | Sd | Sd | Sd | Sd | Sc | GP | Uc |
| | SA | Sd | Sd | Sd | Sd | Sd | Sd | Sd | Sd | Sd | Sd | GP | Sc | Uc |

FIG. 16

| Symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | SA | Sc | Sd | Sd | Sd | Sd | Sd | Sd | Sd | Sd | Sd | Sd | GP | Uc |
| | Sc | SA | Sd | Sd | Sd | Sd | Sd | Sd | Sd | Sd | Sd | Sd | GP | Uc |
| | Sc | GP | Sd | Sd | Sd | Sd | Sd | Sd | Sd | Sd | Sd | Sd | GP | Uc |

METHOD FOR TRANSMITTING AND RECEIVING SIGNAL THROUGH SIDELINK IN NEXT GENERATION WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/003399, filed on Mar. 29, 2017, which claims the benefit of Application No. 62/314,981, filed on Mar. 29, 2016. The disclosures of the prior applications are incorporated by reference in their entirety.

TECHNICAL FIELD

The present invention relates to a next generation wireless communication system, and more particularly, to a method of transmitting/receiving a signal through a sidelink in a next generation wireless communication system and apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF THE INVENTION

Technical Task

Based on the aforementioned discussion, the technical task of the present invention is to propose a method of transmitting/receiving a signal through a sidelink in a next generation wireless communication system and apparatus therefor.

Technical Solutions

In one technical aspect of the present invention, provided herein is a method of transmitting/receiving a sidelink signal through a subframe configured with a plurality of symbols by a user equipment in a wireless communication system, the method including receiving a first sidelink control signal including symbol information for a sidelink data signal in a predetermined first symbol of the subframe, receiving the sidelink data signal in the subframe according to the first sidelink control signal, and transmitting a second sidelink control signal including response information on the sidelink data signal in a second symbol of the subframe.

In another technical aspect of the present invention, provided herein is a user equipment in a wireless communication system, the user equipment including a wireless communication module and a processor connected to the wireless communication module, wherein the processor is configured to receive a first sidelink control signal including symbol information for a sidelink data signal in a predetermined first symbol of the subframe, receive the sidelink data signal in the subframe according to the first sidelink control signal, and transmit a second sidelink control signal including response information on the sidelink data signal in a second symbol of the subframe.

Preferably, the first symbol is determined on the assumption that symbols reserved for a downlink control signal exist in the subframe as many as a maximum number and the second symbol includes a symbol right before a symbol reserved for an uplink control signal in the subframe.

Particularly, the first symbol may include a symbol reserved for the downlink control signal and a symbol defined next to one symbol reserved as a guard period for timing advance application among a plurality of the symbols. In this case, information on the number of symbols reserved for the downlink control signal may be received from a base station through a higher layer.

Additionally, a third sidelink control signal may be transmitted through a specific symbol of the subframe before receiving the sidelink data signal. Particularly, the third sidelink control signal may include response information on a sidelink data signal received in a different subframe before the subframe.

More preferably, the symbol reserved for the downlink control signal is reserved by starting from a first symbol of the subframe. And, the symbol reserved for the uplink control signal includes a last symbol of the subframe.

Advantageous Effects

According to an embodiment of the present invention, a sidelink signal can be transmitted/received in a next generation wireless communication system more efficiently.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification.

FIG. 9 shows a detailed configuration example of a self-contained subframe.

FIG. 11 shows one example of sidelink resource configuration according to an embodiment of the present invention.

FIG. 13 shows another example of sidelink resource configuration according to an embodiment of the present invention.

FIG. 15 shows one example of sidelink resource configuration in which HARQ-ACK resource for sidelink data transmission is configured according to an embodiment of the present invention.

FIG. 16 shows another example of sidelink resource configuration in which HARQ-ACK resource for sidelink data transmission is configured according to an embodiment of the present invention.

BEST MODE FOR INVENTION

Figure 1:
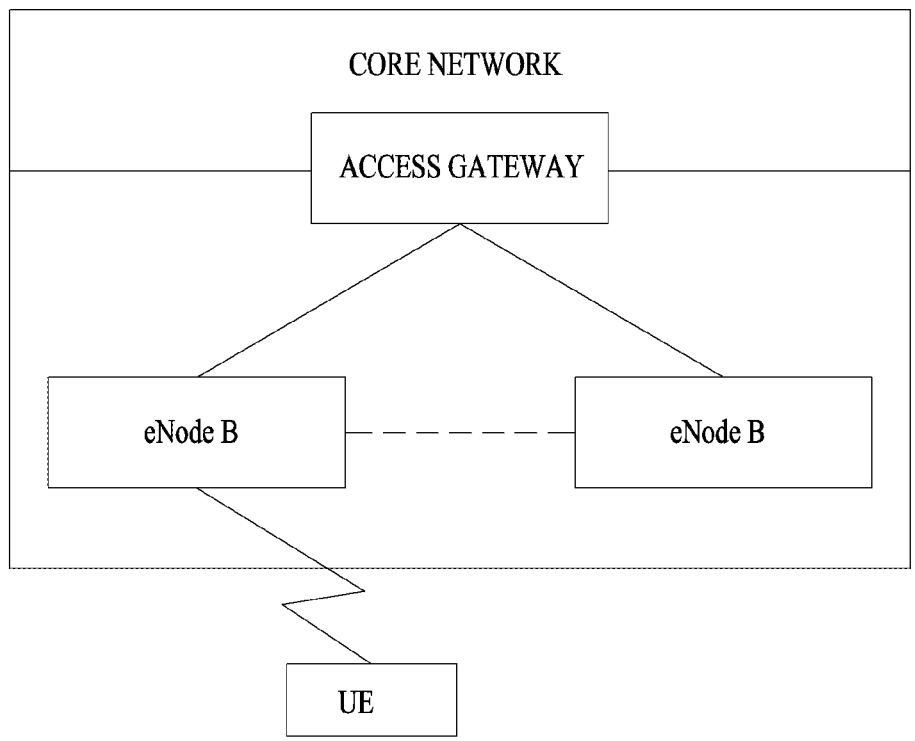
FIG. 1 is a diagram schematically illustrating a network structure of an evolved universal mobile telecommunications system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages.

Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
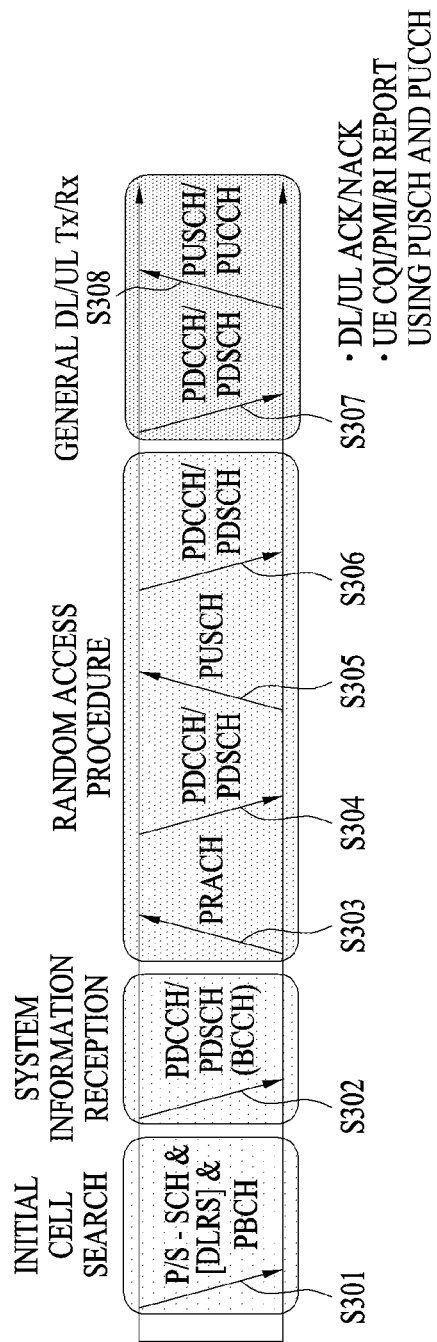
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
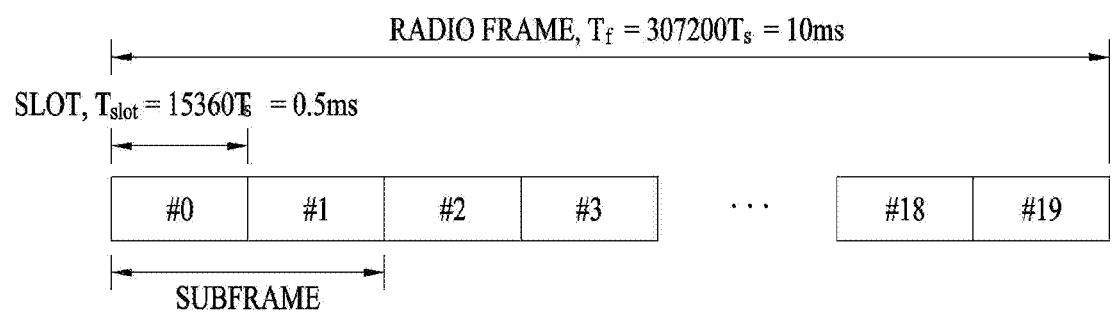
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
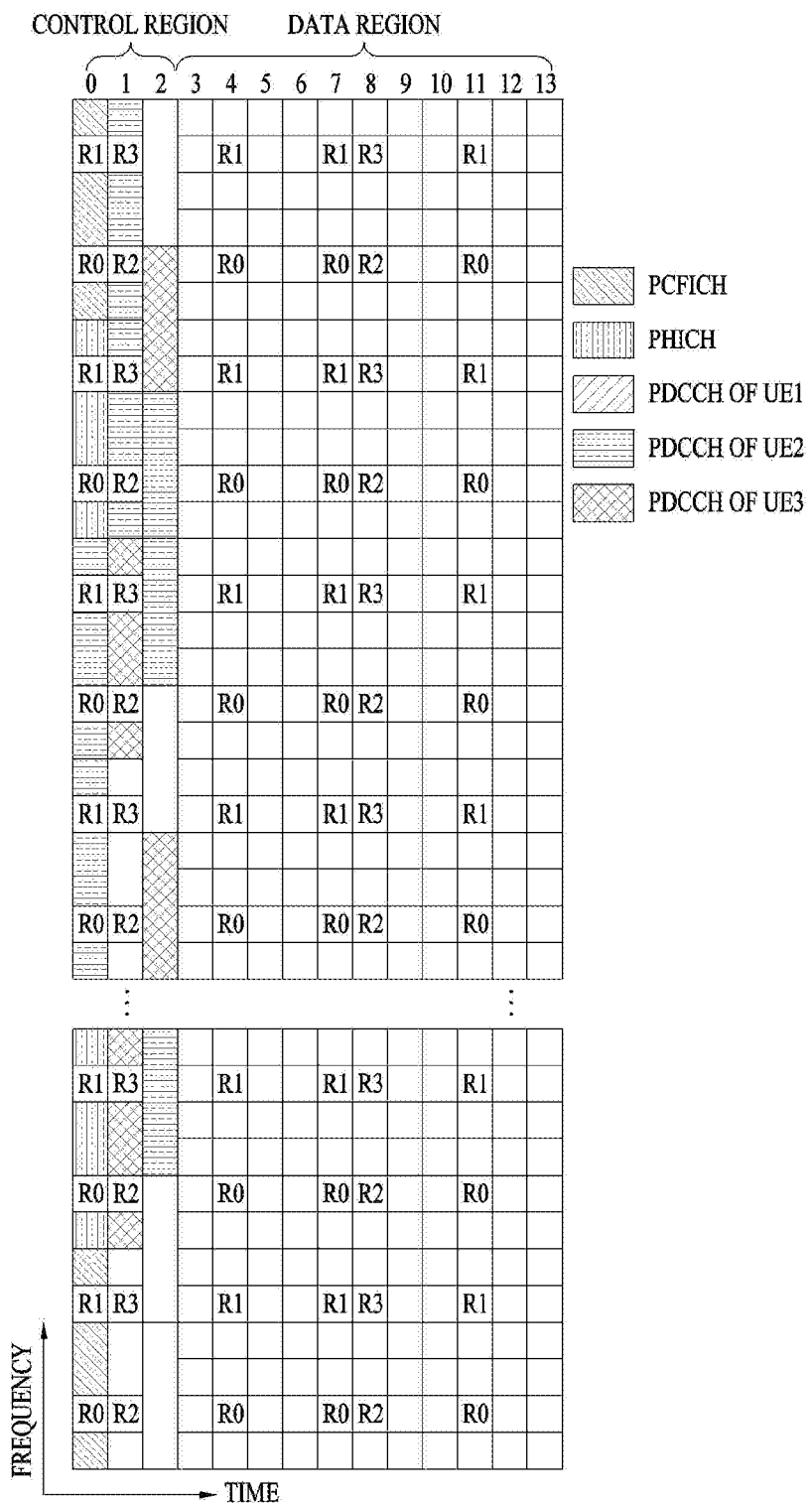
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
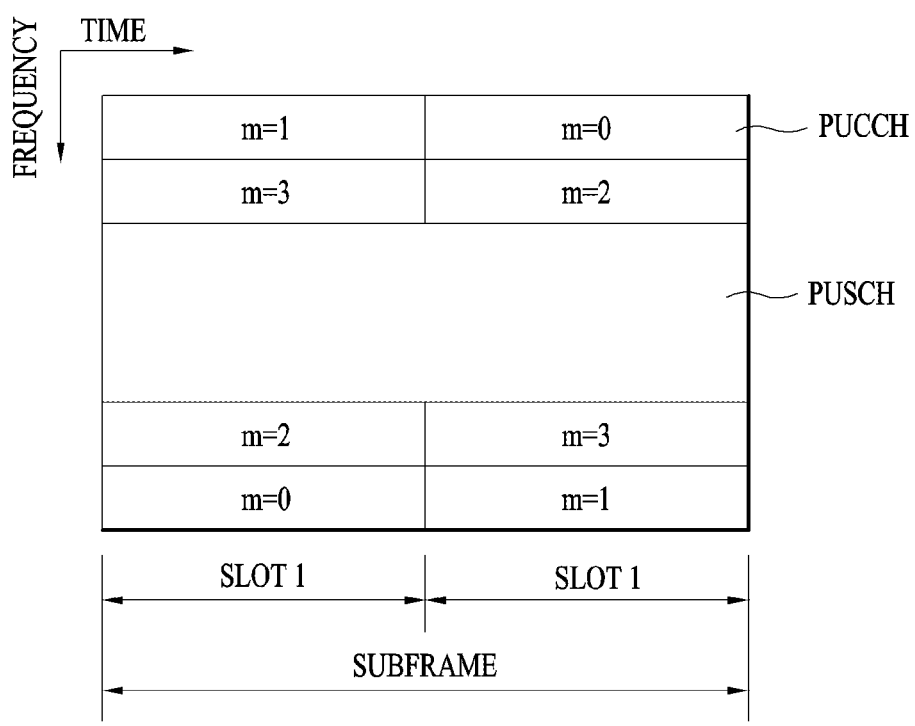
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
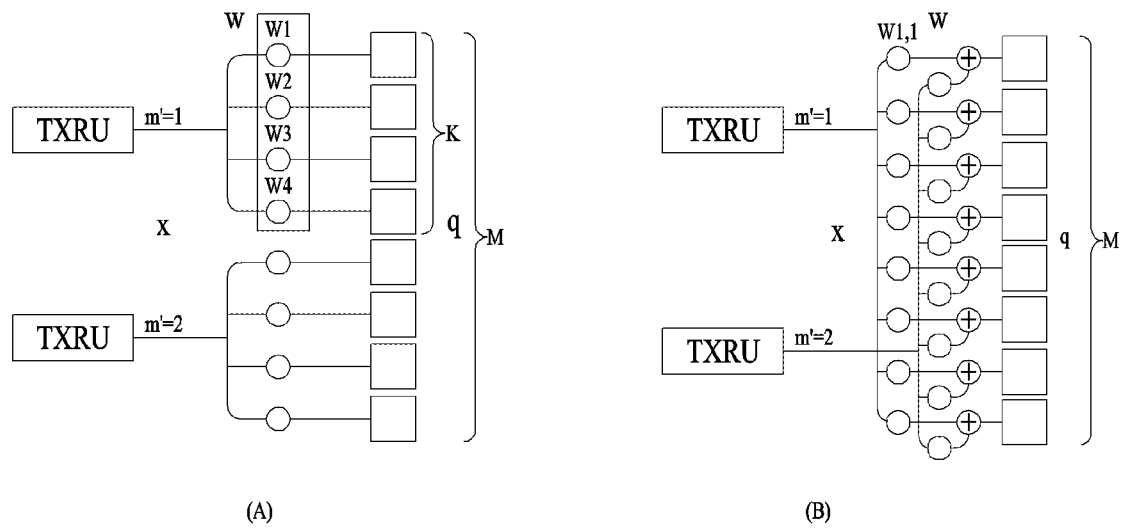
FIG. 7 is a diagram illustrating examples of a connection scheme between TXRUs and antenna elements.

FIG. 7 illustrates examples of a connection scheme between TXRUs and antenna elements.

(A) of FIG. 7 illustrates that TXRU is connected to a sub-array. In this case, the antenna elements are connected to only one TXRU. Unlike (A) of FIG. 7, (B) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

Figure 8:
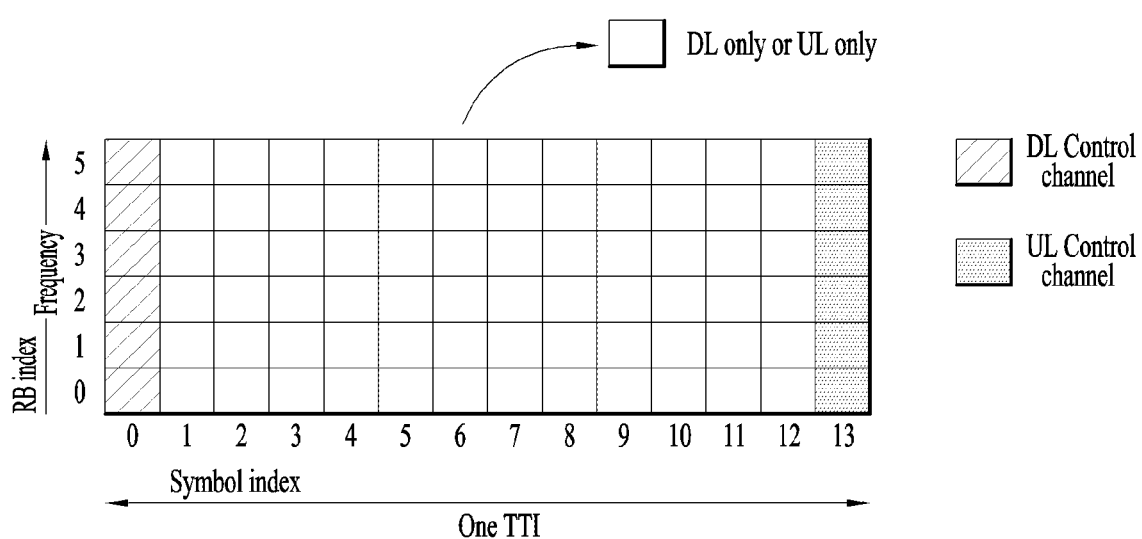
FIG. 8 is a diagram illustrating an example of a self-contained subframe structure.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period (GP).

Examples of the self-contained subframe type that may be configured in the system operating based on the NewRAT may consider four subframe types as follows.

downlink control period+downlink data period+GP+uplink control period
    downlink control period+downlink data period
    downlink control period+GP+uplink data period+uplink control period
    downlink control period+GP+uplink data period FIG. 9 shows a detailed configuration example of a self-contained subframe. Particularly, in FIG. 9, Dc means a DL symbol for a DL control channel transmission and Dd means a DL symbol for a DL data channel transmission. Uc means a UL symbol for a UL control channel transmission, Ud means a UL symbol for a UL data channel transmission, and GP means a symbol for a guard period between DL and UL.

Referring to FIG. 9, total 9 self-contained subframe configurations including configuration #0 to configuration #8 are shown for example. Particularly, CSI-RS means a reference signal received (Rx) symbol for measuring CSI at a UE side, and SRS means a symbol for a sounding reference signal transmission at the UE side.

Figure 10:
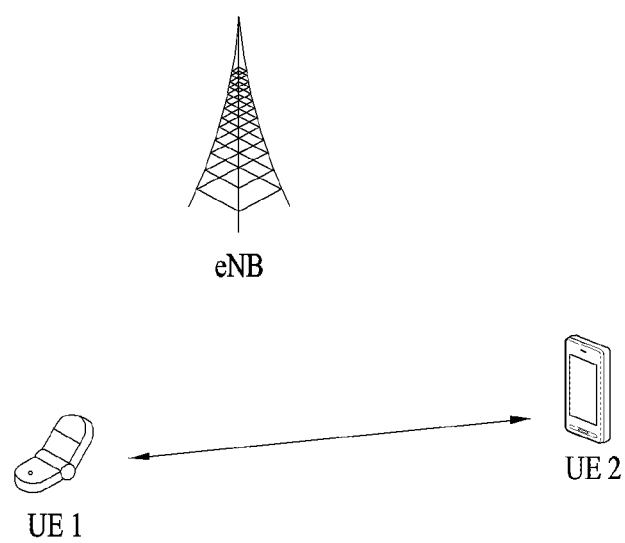
FIG. 10 is a conceptual diagram of D2D direct communication.

FIG. 10 is a conceptual diagram of D2D communication.

Referring to FIG. 10, during Device-to-Device (D2D) direct communication, i.e., D2D communication in which a UE wirelessly communicates with another UE, a base station may transmit a scheduling message to indicate D2D transmission/reception. A UE participating in D2D communication may receive a D2D scheduling message from a base station, and perform Tx/Rx operations indicated by the D2D scheduling message. Here, although the UE means a user's terminal, a network entity such as a base station may be regarded as a sort of UE in case of transmitting and receiving signals according to a communication scheme between UEs. Hereinafter, a link directly connected between UEs shall be referred to as a D2D link, and a link for a UE to communicate with a base station shall be referred to as an NU link. Or, a link directly connected between UEs may be referred to as a SideLink (SL) conceptually in comparison with uplink or downlink.

Described in the following is a case that a UE 1 selects a resource unit corresponding to a specific resource from a resource pool that means a set of a series of resources and then transmits a D2D signal using the corresponding resource unit. Here, if the UE 1 is located in a coverage of a base station, the base station may inform the UE 1 of the resource pool. If the UE 1 is out of the coverage of the base station, the resource pool may be indicated by another UE or determined as a resource determined in advance. Generally, a resource pool is configured with a plurality of resource units and each UE may select and use one or a plurality of resource units for a D2D signal transmission of its own.

For example, an entire frequency resource is divided into $N_F$ and an entire time resource is divided into $N_T$, whereby total $N_F*N_T$ resource units can be defined. Particularly, a corresponding resource pool may be repeated by period of $N_T$ subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time. In such a resource unit structure, a resource pool may mean a set of resource units that can be used for a transmission by a UE intending to transmit a D2D signal.

The above-described resource pool may be subdivided into various types. First of all, it can be classified according to a content of a sidelink signal transmitted on a resource pool. For example, like 1) to 3) in the following, a content of a sidelink signal may be classified into a sidelink data channel and a discovery signal. And, a separate resource pool may be configured according to each content.

1) Scheduling Assignment (SA): This refers to a signal including resource location information of a sidelink data channel followed by a transmitting (Tx) UE and information such as Modulation and Coding Scheme (MCS) for demodulation of a data channel, an MIMO transmission scheme and the like. The SA can be transmitted in a manner of being multiplexed with sidelink data on the same resource unit. In this case, an SA resource pool may mean a pool of resources on which SA is transmitted by being multiplexed with sidelink data.

2) Sidelink data channel: This refers to a channel used for a Tx UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a Tx UE in a manner that the Tx UE transmits information such as its own ID and the like.

4) Synchronization signal/channel: This may be referred to as a sidelink synchronization signal or a sidelink broadcast channel, and mean a resource pool for a signal/channel for a receiving (Rx) UE to achieve a goal of matching time/frequency synchronization with a Tx UE in a manner that the Tx UE transmits a synchronization signal and information relevant to synchronization.

Although SA and sidelink data can use a resource pool separated on a subframe, if a UE is able to transmit SA and sidelink data in a single subframe simultaneously, two kinds of resource pools may be configured in the same subframe.

A UL and a sidelink have the same attribute in that a UE performs transmission and interference. And, interference caused to an adjacent cell or UE basically has the same attribute. Hence, it is preferable that sidelink transmission uses a time period assigned to UL. In case that sidelink transmission occurs at the same timing of DL, if there exists a UE performing DL reception by being adjacent to a sidelink Tx UE, it causes a problem that the corresponding UE receives serious interference. Yet, if an appropriate interference control is performed, a DL period can be utilized as a sidelink. In this case, it is advantageous in that an Rx UE cab perform the same Rx operation. Or, am operation can be performed in a manner of designating a sidelink period as a separate period distinguished from a DL or UL period.

Hereinafter, as described above, a method of configuring a sidelink Tx/Rx resource effectively in a self-contained subframe structure in which a DL part and a UL part can coexist within a single subframe is described.

<Sidelink Resource Configuring Method>

Basically, a method of configuring a sidelink resource can use one of A-1) to A-4) in the following. Particularly, if a specific symbol is used as a sidelink, it may mean that the corresponding symbol is usable for data transmission of sidelink or that the corresponding symbol can be utilized for the usage of transmitting a sidelink control signal (i.e., Scheduling Assignment (SA)) for scheduling sidelink data or for the usage of transmitting HARQ-ACK for sidelink data. Hence, although a specific symbol is configured as a sidelink resource, a Tx UE may not use the corresponding symbol for its data transmission like a case that the corresponding symbol is used for HARQ-ACK transmission of another UE.

Method A-1) Assuming that a DL control signal and/or a UL control signal (SRS inclusive possibly) always exists, a resource of a sidelink is configured to use the rest of the resource.

For example, in a subframe structure, as shown in FIG. 9, a sidelink is provided to use symbols #2 to #11. Or, if symbol #1 is used as a downlink like subframe configuration #2 or subframe configuration #3 in FIG. 9, symbol #2 can be provided to be used as a GP and symbols #3 to #11 can be provided to be used as sidelink. Or, a base station may operate not to configure subframe configuration in which symbol #1 becomes a downlink despite using symbols as a sidelink by starting with symbol #2.

In case of using such a method, it is able to avoid collision with a region utilized as DL and UL control signals. If this method is applied, a symbol region used by a sidelink may be fixed and provided not to vary unless the number of symbols in at least one SF varies.

Method A-2) Assuming that a resource of a sidelink uses all symbols in a subframe, it operates. Exceptionally, a GP for the switching between transmission and reception of a UE can be included. This GP may be located at a first symbol of a subframe. In this case, if a previous subframe uses a last symbol for the usage of DL transmission like the subframe configurations #0, #2, #6 and #7 of FIG. 9, a GP can be advantageously secured between initial sidelink transmissions.

If symbols starting with a first symbol are utilized for sidelink transmission, a base station should perform an appropriate subframe configuration so as not to use a last symbol of a previous subframe as a downlink. A base station can designate a sidelink operational subframe and prevent collision by not performing DL/UL operation except sidelink in the corresponding subframe.

In case of using Method A-1) or Method A-2), since the number of symbols occupied by a sidelink is fixed, implementation complexity can be advantageously reduced by simplifying a sidelink channel structure a UE should implement. Method A-1) can advantageously transmit a UL control signal and/or a DL control signal in a sidelink operating subframe, whereas Method A-2) can advantageously maximize the number of symbols used by a sidelink.

Method A-3) A base station semi-statically adjusts a sidelink operating resource.

For example, if it is able to avoid collision between a sidelink resource and SRS transmission using an appropriate scheduling, a sidelink can be provided to use up to symbol #12. Or, if it is able to avoid collision with a UL/DL control signal in symbol #13, a sidelink can be provided to use up to symbol #13. Or, if it is able to avoid collision with a DL control signal, symbol #0 and symbol #1 may be usable.

By considering such an operation, a base station informs a UE of a sidelink symbol region, which is to be used in a specific sidelink resource pool, in advance through a higher layer signal such as RRC signaling. Based on this, the UE may perform a sidelink operation. If a subframe configuration the base station intends to configure is different per subframe, a sidelink resource to be used may be configured differently in each subframe belonging to a resource pool. Moreover, depending on a UL or DL control signal a base station will schedule despite a subframe belonging to a same resource pool, it is possible to semi-statically designate a location of a symbol, which is to be used for a sidelink, differently in each subframe.

If one of Methods A-1) to A-3) is applied, the base station may designate a subframe operating in sidelink only. And, the base station does not need to dynamically designate where a symbol region used as a sidelink is located in each subframe, thereby reducing the related signaling overhead.

Method A-4) A UE obtains a subframe configuration dynamically designated by a base station through a physical layer control signal and then transmits/receives a sidelink using a symbol (e.g., assigned as a UL data signal) not colliding with DL/UL according to the obtained subframe configuration.

Combinations of the aforementioned methods are possible. For example, a start part of a period used as a sidelink may operate by Method A-4) but an end part may operate by Method A-3).

In case of an operation like Method A-4), a UE belonging to the same cell of a Tx UE may receive a control signal of a base station and obtain a subframe configuration. Yet, a UE belonging to another cell has difficulty in receiving it and operating correctly. In case of using Method A-3), a UE out of a coverage of the base station has difficulty in receiving such a configuration. To solve such problems, SA is transmitted in a manner of a conservative configuration like Method A-1) and a symbol region used on a data channel can be designated through the SA. An Rx UE detects the SA according to the conservative configuration and then receives a data channel based on the obtained information.

<Method of Disposing Sidelink Control Channel and Data Channel>

Hereinafter, a method of disposing a sidelink control channel (i.e., SA) and a sidelink data channel is described.

Method B-1) SA and sidelink data scheduled through the SA may be transmitted using different subcarriers in the same subframe. In case of applying the sidelink resource configuring method A-4), a set of SA mapped symbols may be different from that of sidelink data channel mapped symbols like the above-described embodiment.

Method B-2) As another method of disposing SA, it is able to use a symbol different from that of sidelink data. According to this method, as an Rx UE firstly detects SA and then attempts sidelink data channel reception immediately, a decoding delay of the Rx UE can be reduced advantageously. A sub-method may include the following method.

(Sub-method B-2-1) An SA start point appears right after appearance of a DL control signal or right after a GP appearing after the DL control signal. This method is effective in reducing a decoding delay by avoiding collision with a DL control signal and may be used by being combined with the aforementioned sidelink resource configuring method A-1), A-3) or A-4).

FIG. 11 shows one example of sidelink resource configuration according to an embodiment of the present invention. Particularly, FIG. 11 assumes that subframe configuration #4 of FIG. 9 is configured. SA, Sd and Sc mean Scheduling Assignment (SA), sidelink data and sidelink control signal (HARQ-ACK for sidelink data), respectively.

In FIG. 11, a first subframe configuration corresponds to a case that GP does not exist between Sd and Sc. In FIG. 11, a second subframe configuration corresponds to a case that symbol #12 is used as GP required for switching from sidelink data transmission to HARQ-ACK reception.

In the first subframe configuration of FIG. 11, although an explicit GP does not exist between symbol #12 and symbol #13, a switching time may exist. This is enabled by advancing a sidelink transmission timing from the symbol #12.

Figure 12:
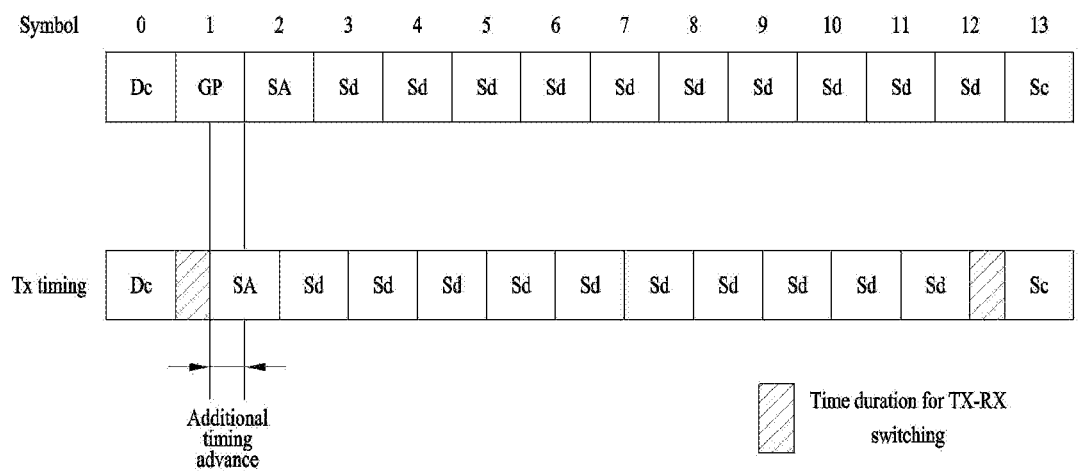
FIG. 12 shows one example that an additional Timing Advance (TA) is applied in sidelink resource configuration according to an embodiment of the present invention.

FIG. 12 shows one example that an additional Timing Advance (TA) is applied in sidelink resource configuration according to an embodiment of the present invention. Referring to FIG. 12, as an additional TA corresponding to a half of one symbol is applied, a switching time amounting to a half symbol is secured between Dc and SA or between Sd and Sc.

Particularly, this method is effective when a TA for UL transmission is not applied to a sidelink. And, the principle of providing a switching time between symbols used for a sidelink by applying an additional TA is applicable to a sidelink frame structure of a different type.

(Sub-method B-2-2) SA starts from a first symbol of a subframe. According to this method, a transmission resource of SA is configured with the same as a transmission resource of a DL control signal. In aspect of an Rx UE, an operation very similar to receiving a downlink is possible. The sub-method B-2-2 is combinable with the aforementioned sidelink resource configuring method A-2). If the sub-method B-2-2 is combined with other sidelink resource configuring method, base station's appropriate scheduling is required. If interference between UEs can be adjusted appropriately, a DL control signal and an SA may be transmitted in the same symbol using different frequency resources. In case of performing this operation, a base station informs a Tx UE that a DL control signal the corresponding UE should receive does not exist in the corresponding subframe and then allows the corresponding UE to perform sidelink signal transmission using a DL control signal period.

FIG. 13 shows another example of sidelink resource configuration according to an embodiment of the present invention. Particularly, it can be observed from FIG. 13 that symbol #0 and symbol #12 are used as SA and GP, respectively.

Figure 14:
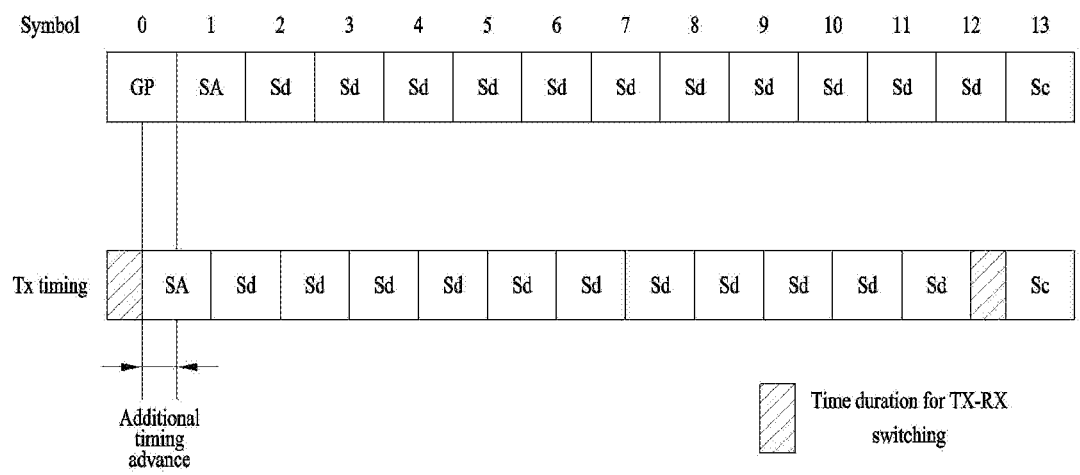
FIG. 14 shows another example that an additional TA is applied in sidelink resource configuration according to an embodiment of the present invention.

FIG. 14 shows another example that an additional TA is applied in sidelink resource configuration according to an embodiment of the present invention. Particularly, as described in the aforementioned sidelink resource configuring method A-2), when a first symbol of a subframe is used as a GP, if SA, Sd and Sc are located contiguously, FIG. 14 shows a case of applying an additional TA.

Or, as another method of using the configuration exemplarily shown in FIG. 13, sidelink transmission is performed from symbol #0 without a separate additional TA. And, a sidelink Tx/Rx operation can be performed by configuring a last symbol of a previous subframe as a GP. In this case, a base station may always configure a last symbol of a subframe previous to a sidelink Tx subframe starting from the symbol #0 as a GP, or a UE participating in sidelink transmission/reception may be provided to avoid transmitting Uc at a corresponding timing despite that the corresponding symbol is configured as Uc.

<HARQ-ACK Resource Configuration for Sidelink Data Transmission>

Hereinafter, a method of configuring an HARQ-ACK resource for sidelink data transmission is described.

Method C-1) HARQ-ACK in sidelink may be transmitted in the same symbol of a UL control signal and use a different frequency resource. If a same UE needs to transmit HARQ-ACK for a DL data signal and HARQ-ACK for sidelink data at a timing simultaneously, separate transmissions are possible. FIG. 11 and FIG. 13 follow such a method.

Method C-2) HARQ-ACK in sidelink uses a symbol previous to a symbol used by a UL control signal.

FIG. 15 shows one example of sidelink resource configuration in which HARQ-ACK resource for sidelink data transmission is configured according to an embodiment of the present invention. Particularly, assumed in a first subframe configuration is a case that a single UE consecutively transmits SA, Sd and Sc. Eventually, Sc becomes HARQ-ACK for Sd transmitted ahead of Sd of the same subframe. Hence, GP exists between Sc and Uc. This is to enable a UE having received Sc to secure a time required for switching to transmission of Uc.

If it is intended to support a case that a UE transmitting Sd of symbol #10 and a UE transmitting Sc of symbol #11 are different from each other, it is able to use a second subframe configuration of FIG. 15. Here, after symbols have been disposed in order of Sd→GP→Sc→Uc, it is able to guarantee the Tx/Rx switching of a UE using GP between Sd and Sc. Additionally, as an additional TA is applied to Sc by applying the principle described with reference to FIG. 12, a switching time can be generated between Sc and Uc. Through this, the UE having received Sc in symbol #12 can transmit Uc in symbol #13 again. Or, without performing such an operation, a single UE may be provided to avoid a case of transmitting Uc in symbol #13 right after receiving Sc in symbol #12 through base station's appropriate scheduling.

Method C-3) HARQ-ACK in sidelink uses a symbol located at a fore part of a subframe. Namely, as an Rx UE transmits HARQ-ACK relatively quickly, a Tx UE can determine a presence or non-presence of retransmission quickly and prepare for a next transmission.

FIG. 16 shows another example of sidelink resource configuration in which HARQ-ACK resource for sidelink data transmission is configured according to an embodiment of the present invention. Particularly, a first subframe configuration of FIG. 16 shows a case that HARQ-ACK is transmitted after SA, and a second subframe configuration of FIG. 16 shows a case that HARQ-ACK is transmitted before SA. Moreover, a third subframe configuration of FIG. 16 shows a case that GP exists between Sc and SA.

In some implementations, although a first symbol is assumed as usable as a sidelink in FIG. 15 or FIG. 16, even if some first symbols are used as a downlink, SA or Sc may be located at a first symbol usable as a sidelink.

Figure 17:
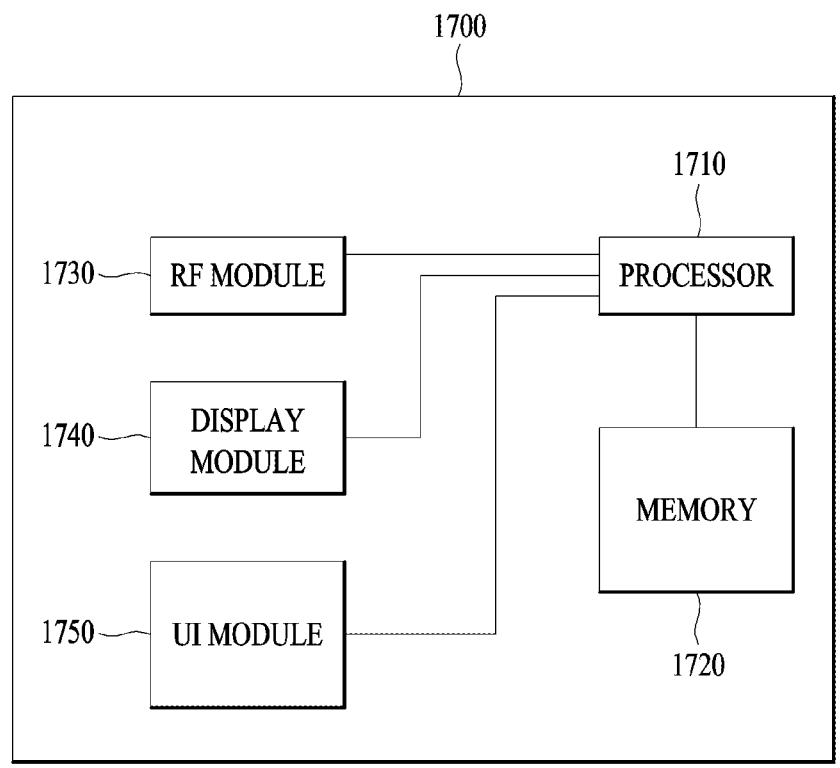
FIG. 17 is a block diagram of a communication apparatus according to an embodiment of the present invention.

FIG. 17 is a block diagram of a communication apparatus according to an embodiment of the present invention.

Referring to FIG. 17, a communication apparatus 1700 includes a processor 1710, a memory 1720, a Radio Frequency (RF) module 1730, a display module 1740 and a user interface module 1750.

The communication apparatus 1700 is shown for convenience of description and some modules thereof may be omitted. In addition, the communication apparatus 1700 may further include necessary modules. In addition, some modules of the communication apparatus 1700 may be subdivided. The processor 1710 is configured to perform an operation of the embodiment of the present invention described with respect to the drawings. For a detailed description of the operation of the processor 1710, reference may be made to the description associated with FIGS. 1 to 16.

The memory 1720 is connected to the processor 1710 so as to store an operating system, an application, program code, data and the like. The RF module 1730 is connected to the processor 1710 so as to perform a function for converting a baseband signal into a radio signal or converting a radio signal into a baseband signal. The RF module 1730 performs analog conversion, amplification, filtering and frequency up-conversion or inverse processes thereof. The display module 1740 is connected to the processor 1710 so as to display a variety of information. As the display module 1740, although not limited thereto, a well-known device such as a Liquid Crystal Display (LCD), a Light Emitting Diode (LED), or an Organic Light Emitting Diode (OLED) may be used. The user interface module 1750 is connected to the processor 1710 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of transmitting/receiving a signal through a sidelink in a next generation wireless communication system and apparatus therefor are described by focusing on examples applying to the 3GPP LTE system, they are applicable to various wireless communication systems as well as to the 3GPP LTE system.

What is claimed is:

1. A method performed by a user equipment operating in a wireless communication system, the method comprising:
   receiving, in a first symbol of a subframe configured with a plurality of symbols, a first sidelink control signal including symbol information for a sidelink data signal;
   receiving the sidelink data signal in the subframe according to the first sidelink control signal; and
   transmitting, in a second symbol of the subframe, a second sidelink control signal including response information regarding the sidelink data signal,
   wherein a location of the first symbol is determined based on an assumption that a number of symbols that are reserved for a downlink control signal exist in the subframe as many as a maximum number, and
   wherein a location of the second symbol is immediately before a third symbol that is reserved for an uplink control signal in the subframe.

2. The method of claim 1, wherein the first symbol comprises a symbol reserved for the downlink control signal and a symbol defined next to one symbol reserved as a guard period for timing advance application among a plurality of symbols.

3. The method of claim 2, wherein information on the number of symbols reserved for the downlink control signal is received from a base station through a higher layer.

4. The method of claim 1, further comprising transmitting a third sidelink control signal through a specific symbol of the subframe before receiving the sidelink data signal,
   wherein the third sidelink control signal comprises second response information regarding a second sidelink data signal that is received in a different subframe before the subframe.

5. The method of claim 1, wherein the symbols that are reserved for the downlink control signal are reserved by starting from an initial symbol of the subframe.

6. The method of claim 1, wherein the third symbol that is reserved for the uplink control signal is a last symbol of the subframe.

7. A user equipment configured to operate in a wireless communication system, the user equipment comprising:
   a wireless communication module;
   at least one processor; and at least one computer memory operably connectable to the at least one processor and storing instructions that, when executed by the at least one processor, perform operations comprising:

receiving, in a first symbol of a subframe through the wireless communication module, a first sidelink control signal including symbol information for a sidelink data signal;

receiving, through the wireless communication module, receive the sidelink data signal in the subframe according to the first sidelink control signal;

transmitting, in a second symbol of the subframe, a second sidelink control signal including response information regarding the sidelink data signal, wherein a location of the first symbol is determined based on an assumption that a number of symbols that are reserved for a downlink control signal exist in the subframe as many as a maximum number, and wherein a location of the second symbol is immediately before a third symbol that is reserved for an uplink control signal in the subframe.

8. The user equipment of claim 7, wherein the first symbol comprises a symbol reserved for the downlink control signal and a symbol defined next to one symbol reserved as a guard period for timing advance application among a plurality of symbols.

9. The user equipment of claim 8, wherein information on the number of symbols reserved for the downlink control signal is received from a base station through a higher layer.

10. The user equipment of claim 7, wherein the operations further comprise:

transmitting processor transmits a third sidelink control signal through a specific symbol of the subframe before receiving the sidelink data signal, and wherein the third sidelink control signal comprises second response information regarding a second sidelink data signal that is received in a different subframe before the subframe.

11. The user equipment of claim 7, wherein the symbols that are reserved for the downlink control signal are reserved by starting from an initial symbol of the subframe.

12. The user equipment of claim 7, wherein the third symbol that is reserved for the uplink control signal is a last symbol of the subframe.

* * * * *